United States Patent [19]

Cheng et al.

[11] Patent Number: 5,112,778

[45] Date of Patent: May 12, 1992

[54] BATCH COMPOSITION FOR MAKING INFRARED AND ULTRAVIOLET RADIATION ABSORBING GREEN GLASS

[75] Inventors: J. Joseph Cheng; Richard R. Snow, both of Perrysburg, Ohio; Geoffrey Evans, Preston; Charles R. Bamford, Ainsdale; Harold B. Milnes, Billinge, all of United Kingdom

[73] Assignee: Libbey-Owens-Ford Co., Toledo, Ohio

[21] Appl. No.: 699,314

[22] Filed: May 13, 1991

Related U.S. Application Data

[63] Continuation-in-part of Ser. No. 472,593, Jan. 30, 1990, abandoned.

[51] Int. Cl.⁵ .................. C03C 6/04; C03C 3/087; C03C 3/095; C03C 4/08
[52] U.S. Cl. .................. 501/31; 501/27; 501/64; 501/70; 501/904; 501/905
[58] Field of Search ............ 501/70, 64, 905, 904, 501/27, 31

[56] References Cited

U.S. PATENT DOCUMENTS 4,701,425 10/1987 Baker et al. ............... 501/70
4,792,536 12/1988 Pecoraro ................... 501/70

*Primary Examiner*—Mark L. Bell
*Attorney, Agent, or Firm*—Marshall & Melhorn

[57] ABSTRACT

An infrared energy and ultraviolet radiation absorbing green-colored high total iron containing soda-lime-silica glass batch includes typical soda-lime-silica glass batch ingredients, an ultraviolet radiation absorbing quantity of a cerium containing compound, a high amount of total iron, and a surprisingly small amount of carbon which eliminates silica scum formation in the melt and silica inclusion faults in the finished glass.

27 Claims, No Drawings

BATCH COMPOSITION FOR MAKING INFRARED AND ULTRAVIOLET RADIATION ABSORBING GREEN GLASS

This application is a continuation-in-part of U.S. patent application Ser. No. 07/472,593, filed Jan. 30, 1990, now abandoned.

FIELD OF THE INVENTION

The present invention relates generally to a glass batch composition for making infrared and ultraviolet radiation absorbing green glass.

BACKGROUND OF THE INVENTION

It is generally known to manufacture infrared radiation absorbing soda-lime-silica glass by the incorporation therein of iron. The iron is generally present in the glass as both ferrous oxide (FeO) and ferric oxide (Fe$_2$O) The total amount of iron and the balance between ferrous and ferric oxides has a direct and material effect on the color and transmittance properties of the glass. As the ferrous oxide content is increased (as a result of chemically reducing the ferric oxide), the infrared absorption increases and the ultraviolet absorption decreases. The shift toward a higher concentration of FeO in relation to Fe$_2$O$_3$ also causes a change in the color of the glass from a yellow or yellow-green to a darker green or blue-green, which reduces the visible transmittance of the glass. Therefore, in order to obtain greater infrared absorption in glass, without sacrificing visual transmittance, it has been deemed necessary in the prior art to produce glass with a low total iron content which is highly reduced from Fe$_2$O$_3$ to FeO. A low total iron content glass is generally regarded as one having less than about 0.70% by weight total iron expressed as Fe$_2$O$_3$ For example, U.S. Pat. No. 3,652,303 discloses an infrared absorbing blue colored soda-lime-silica glass composition having a visible light transmittance greater than 70% at one quarter inch thickness, wherein at least 80% of the low total iron content in the glass is maintained in the ferrous state by the inclusion of a reducing quantity of tin metal or stannous chloride in the melt.

Many iron containing glass compositions additionally contain well known adjuvants such as titanium dioxide, molybdenum dioxide, and ceric oxide, for the purpose of providing ultraviolet energy absorption. These known ultraviolet energy absorbers have particular disadvantages, especially in the manufacture of automotive glazings, in that they cause the color of the glass to shift from a desirable green or blue-green to an unacceptable yellow color. Ceric oxide may be added, however, at a low enough concentration so as not to adversely affect the desirable green or blue-green color of such a glass.

U.S. Pat. No. 1,414,715 discloses the addition of 3% to 6% by weight of ceric oxide to prepare a non-iron-containing glass composition having a flesh tint. The patent additionally teaches that ceric oxide reduces the visible light transmittance of the glass.

U.S. Pat. No. 1,637,439 discloses the use of 5% to 10% by weight of ceric oxide as an ultraviolet absorber in dark blue glass compositions. The glass, which is useful for example for observing the operation of an open-hearth furnace, is made dark blue by the addition of 0.1% to 0.5% by weight of cobalt oxide. The high concentration of ceric oxide absorbs virtually all of the ultraviolet radiation which would otherwise pass through the eye protecting glass. Clearly, such a glass composition has a low visible light transmittance, and would not be useful for automotive or architectural glazings.

U.S. Pat. No. 1,936,231 discloses a colorless glass, wherein ferric oxide is added as an ultraviolet cut-off agent in quantities so small that the resultant glass retains its high visible light transmittance. The suggested total iron content is approximately 0.35% by weight. The patent further discloses that cerium compounds may be added in small quantities, as ultraviolet radiation cut-off agents, to low total iron containing glass compositions. Thus, the resultant glass compositions retain their colorless appearance and high visible light transmittance properties.

U.S. Pat. No. 2,524,719 discloses a rose colored glass composition, wherein iron is added to the glass batch as an infrared energy absorber, and selenium is added as an ultraviolet radiation absorber. It is suggested that ceric oxide may be included, at an amount in excess of 3% by weight, to assist the selenium in the absorption of ultraviolet radiation.

U.S. Pat. No. 2,860,059 discloses an ultraviolet absorbing glass composition, having a low total iron concentration, which is described as superior in visible light transmittance to the greenish-blue glasses generally used in automotive and architectural glazings. The maximum iron content is 0.6% by weight, in order for the glass to maintain its colorless appearance and high visible light transmittance. Titanium dioxide, and up to 0.5% by weight ceric oxide, are added to the glass for the purpose of providing ultraviolet radiation absorption.

U.S. Pat. No. 2,444,976 discloses a golden colored glass particularly adapted for glazing aircraft, having an exceptionally low transmittance in the ultraviolet and a high transmittance in the visible. The glass contains iron oxide as a heat absorbing component together with large amounts of both cerium oxide (1.5% to 3%) and titanium oxide (6% to 9%).

Finally, U.S. Pat. No. 4,792,536 discloses a process for producing an infrared energy absorbing glass, containing a low total iron concentration which is highly reduced to FeO. It is further disclosed that the infrared energy absorption can be increased by including greater amounts of total iron in the glass composition, but states that the visible light transmittance would thereby be reduced below levels considered adequate for automotive glazings. The disclosed process utilizes a two stage melting and refining operation, which provides highly reducing conditions so as to increase the amount of iron in the ferrous state for a given low total iron concentration of from 0.45% to 0.65% by weight. The patent teaches that the iron must be at least 35% reduced to FeO. Most preferably, greater than 50% of the total iron content must be reduced to the ferrous state. It is further disclosed that 0.25% to 0.5% by weight of ceric oxide may be added to the highly reduced, low total iron containing glass, for the purpose of absorbing ultraviolet radiation. It is disclosed that higher concentrations of ceric oxide are to be avoided, as they would compromise the overall transmittance properties of the glass. As an example of the glass which may be produced by the process taught in U.S. Pat. No. 4,792,536, Composition No. 11 discloses a low total iron containing glass, which is 30% reduced to FeO, and contains 1% ceric oxide. At a thickness of 4 mm, the total solar energy transmittance is about 52%, and the ultraviolet radiation transmittance is about 37%. The relatively high total solar energy transmittance value results from the low total iron concentration, while the relatively high ultraviolet radiation transmittance value is caused by the low concentration of total iron expressed as $Fe_2O_3$, a large portion of which has been reduced to FeO.

It is common in the glass industry to refer to the total iron contained in a glass composition or batch as "total iron" or "total iron expressed as $Fe_2O_3$". When a glass batch is melted, however, some of this amount of total iron is reduced to FeO, while the rest remains $Fe_2O_3$. The balance between ferrous and ferric oxides in the melt is a result of the oxidation-reduction equilibrium, and is expressed herein and in the appended claims as the "ferrous value". Reduction of $Fe_2O_3$ produces not only FeO, but oxygen gas as well, thus decreasing the combined weight of the two iron compounds in the resultant glass product. Consequently, the combined weight of the actual FeO and $Fe_2O_3$ contained in a resulting glass composition will be less than the batch weight of the total iron expressed as $Fe_2O_3$. For this reason, it shall be understood that "total iron" or "total iron expressed as $Fe_2O_3$", as used herein and in the appended claims, means the total weight of iron contained in the glass batch before reduction. It should further be understood that "ferrous value", as used herein and in the appended claims, is defined as the weight percent ferrous oxide in the resultant glass divided by the weight percent of total iron expressed as $Fe_2O_3$.

Ceric oxide is a powerful oxidizer, and when added to an iron containing soda-lime-silica glass batch composition, greatly affects the balance between ferrous oxide and ferric oxide. Carbon may be added to the glass batch to compensate for the oxidizing effect of the ceric oxide. However, high amounts of carbon have a detrimental effect on the batch melting process, as carbon preferentially reacts with batch sulfates such as salt cake or gypsum which are standard additives to soda-lime-silica glasses to accelerate silica dissolution and also act as fining agents. Thus, excessive carbon is known to cause silica scum formation during the melting of the batch and silica inclusion faults in the finished glass product.

It is known that, in order to maintain the ferrous value and therefore the green color of the glass, the amount of carbon required to counteract the oxidizing effect of about one weight percent of ceric oxide in a typical low total iron containing soda-lime-silica glass produced by the float glass process is generally in the range of 0.9 pounds of carbon per 1,000 pounds of glass. This level of carbon, however, interferes with the "silica wetting" action of the salt cake or gypsum, and thereby results in silica scum formation during the melting process and silica inclusion faults in the final product, as discussed hereinabove.

In order to maintain a constant ferrous value while counteracting the oxidizing effect of a constant amount of ceric oxide as the iron content of soda-lime-silica glass is increased to that of a high iron containing glass, for example to about 0.8% total iron, it is predicted either that the same amount of carbon must be added because the ceric oxide level is constant, or that the carbon requirement will be even greater because the equilibrium ferrous value decreases with increased iron addition, as disclosed in N.E. Densem and W.E.S. Turner, "The Equilibrium Between Ferrous and Ferric Oxides in Glasses", Journal of the Society of Glass Technology, vol. XXII, no. 914, Dec. 1938, pp. 372-389. Thus, it is predicted that a batch composition for producing a green-colored glass having high infrared energy absorption due to a high FeO concentration (from the partial decomposition of $Fe_2O_3$ in the high total iron containing batch), and high ultraviolet radiation absorption partially due to a high concentration of ceric oxide (which is not so high as to cause the glass to appear yellow) and partially due to the large amount of $Fe_2O_3$ which remains in the higher oxidized state, will suffer from silica scum formation during melting and result in glass having silica inclusion faults, due to excessive carbon addition.

It would be desirable to produce a green-colored glass, utilizing conventional float glass technology, for use in automotive and architectural glazings, having a high Illuminant A visible light transmittance of at least 70%, a low total solar energy transmittance of less than about 46%, and a low ultraviolet radiation transmittance of less than about 36%, at a nominal glass thickness from about 3.2 to 5 mm. It should be understood that the recitation of glass thickness, as used herein and in the appended claims, means total glass thickness for a glazing unit, which may be composed of a single glass sheet or two or more glass sheets, the total thickness of which is in the indicated range. The prior art suggests that such a glass composition having a high total iron concentration and about 1% ceric oxide, can only be produced by including a large amount of carbon in the melt, resulting in silica scum formation and silica inclusion faults in the final product.

It must be noted that the prior art referred to hereinabove has been collected and examined only in light of the present invention as a guide. It is not to be inferred that such diverse art would otherwise be assembled absent the motivation provided by the present invention.

SUMMARY OF THE INVENTION

In accordance with the present invention, it has surprisingly been discovered that the balanced redox reaction between ferrous and ferric iron, ceric oxide, and carbon in a soda-lime-silica float glass melt, shifts to a more reduced state when the total iron content is increased from a low to a high total iron concentration, for example from about 0.5% iron to about 0.8% iron. Thus, the ferrous value increases rather than decreases, as suggested by the prior art. Consequently, in order to shift the redox reaction so as to obtain the same ferrous value manifested at the low total iron concentration, the quantity of carbon added to the melt having a high total iron content must be reduced, contrary to the wisdom of the prior art.

Less carbon, therefore, is required in a high total iron containing soda-lime-silica float glass melt than that used in a low total iron containing melt, at a constant concentration of ceric oxide, in order to maintain a specific ferrous value. For example, carbon addition may be reduced from about 0.9 pounds to about 0.35 pounds per 1,000 pounds of glass, when the total iron concentration is increased from about 0.5% to about 0.8% by weight, at a constant ferrous value of about 25% and a constant ceric oxide concentration of about 1% by weight. This lower amount of added carbon eliminates the problem of silica scum formation during melting, and likewise eliminates the formation of silica inclusion faults in the final product.

It has surprisingly been discovered that a batch composition for producing an infrared and ultraviolet radiation absorbing green-colored glass, said batch composition when melted in a float glass tank producing a glass having a ferrous value from about 22% to about 29%, comprises:

A) a soda-lime-silica float glass batch mixture;
B) an ultraviolet radiation absorbing quantity of a cerium containing compound, in an amount which does not substantially affect the color of the glass;
C) an amount of iron so as to result in at least 0.70 weight percent total iron in the glass; and
D) a quantity of carbon, which is less than the amount of carbon required to achieve the same ferrous value in a glass produced from a glass batch comprising ingredients A, B, and an amount of iron so as to result in 0.5 weight percent total iron in the glass.

Alternatively, the amount of $CeO_2$ may be reduced by the inclusion of from about 0.15 to about 0.35 weight percent $TiO_2$. Percentages of $TiO_2$ below about 0.02 weight percent are normally present as trace amounts in soda-lime-silica glasses.

A batch composition of the present invention may be melted and formed into a 4 mm thick glass article having an Illuminant A visible light transmittance greater than 70%, a total solar energy transmittance less than about 46%, and an ultraviolet radiation transmittance less than about 36%, preferably less than about 34%.

These glasses have an illuminant C dominant wavelength from about 498 nanometers to about 525 nanometers, preferably from about 498 to 519 nanometers, and a color purity from about 2 percent to about 4 percent, preferably from about 2 percent to about 3 percent.

The batch compositions of the present invention are particularly suited for the production of infrared and ultraviolet radiation absorbing green-colored automotive and architectural glazings by the float glass process. Thus, glass sheets produced by these batch compositions may be heat strengthened or tempered, or alternately annealed and laminated together through an interposed transparent resinous layer composed, for example, of polyvinyl butyral, and employed, for example, as a windshield. Glass sheets for windshield use generally range in thickness from about 1.7 mm to about 2.5 mm, while tempered glass sheets for use as sidelights or backlights generally range from about 3.2 mm to about 6 mm thick.

Unless otherwise noted, the term percent (%) as used herein and in the appended claims, means percent (%) by weight. Wavelength dispersive X-ray fluorescence was used to determine the weight percents of $CeO_2$, $TiO_2$, and total iron expressed as $Fe_2O_3$. Percent reduction of total iron was determined by first measuring the radiant transmission of a sample at a wavelength of 1060 nanometers, using a spectrophotometer. The 1060 nm transmission value was then used to calculate optical density, using the following formula:

$$\text{Optical density} = \text{Log}_{10}\frac{100}{T} \quad (T = \text{transmission at 1060 nm}).$$

The optical density was then used to calculate the percent reduction:

$$\frac{\text{percent}}{\text{reduction}} = \frac{(110) \times (\text{optical density})}{(\text{Glass thickness in mm}) \times (\text{wt \% total } Fe_2O_3)}$$

DETAILED DESCRIPTION OF THE PREFERRED EMBODIMENT

For use as an automotive windshield, infrared energy and ultraviolet radiation absorbing glass must meet federal specifications which require an Illuminant A visible light transmittance greater than 70%. The thinner glasses used in modern automobiles have made it easier to achieve the 70% Illuminant A standard, but have also resulted in increased infrared energy and ultraviolet radiation transmittances. Consequently, automobile manufacturers have been forced to compensate for greater heat loads by appropriately sizing air conditioning equipment. In addition, they are compelled to include more ultraviolet radiation stabilizers in fabrics and interior plastic components in order to prevent their degradation.

It is generally known in the art to produce a low total concentration highly reduced iron containing glass, having a high visible light transmittance and low infrared energy transmittance, by the float glass process. Cerium compounds are known to reduce the ultraviolet radiation transmittance of such glasses. However, the amount of carbonaceous reducing agent required for preparing such glasses has made their manufacture difficult, as the carbon preferentially reacts with the salt cake or gypsum fining agent to cause a silica rich layer (silica scum) to form on the top of the melt. Additionally, the glass products produced by such a process suffer from silica inclusion faults, making the products unfit for automotive or architectural glazings.

It has surprisingly been discovered that a high total iron containing glass, having high visible light transmittance and low infrared energy and ultraviolet radiation transmittances*, may be prepared by melting together typical soda-lime-silica batch ingredients, including a high amount of total iron, i.e., at least 0.70 weight percent, a quantity of a cerium containing compound, and an unexpectedly small amount of carbon. The small amount of carbon, which is contrary to the teaching of the prior art, results in the elimination of silica scum formation during the melting of the batch composition, and the formation of silica inclusion faults in the finished glass product. Alternatively, the quantity of a cerium containing compound may be replaced by a lesser quantity of a mixture of a cerium containing compound and titanium dioxide, resulting in an even lower required amount of carbon.

Radiation transmittance results are based upon the following wavelength ranges:
Ultraviolet: 300–400 nanometers  Visible: 400–770 nanometers  Total Solar: 300–2130 nanometers Suitable batch ingredients, according to the present invention, which are compounded by conventional glass batch ingredient mixing devices, include sand, limestone, dolomite, soda ash, rouge, carbon, salt cake or gypsum, and a cerium containing compound such as cerous carbonate. Optionally, titanium dioxide may be added in place of a portion of the cerium containing compound, as discussed further hereinbelow. These materials are conveniently melted together in a conventional glass making furnace, to form a green-colored infrared energy and ultraviolet radiation absorbing glass composition, which thereafter may be continuously cast onto the molten metal bath of a float process. The flat glass thus produced may be formed into architectural glazings, or cut and formed, such as for example by press bending, into automotive glazings.

Soda-lime-silica float glass batch mixtures are well known in the art of glass making. A typical soda-lime-silica float glass batch mixture comprises the following ingredients in their indicated relative proportions:

Sand: 1,000±200 pounds (60±12 wt %)
Soda Ash: 330±50 pounds (20±3 wt %)
Dolomite: 250±50 pounds (15±3 wt%)
Limestone: 70±50 pounds (4.2±3 wt %)
Sulfate: 12±8 pounds (0.72±0.5 wt %)

The sulfate may be for example salt cake or gypsum. This batch yields approximately 1,400±300 pounds of glass after melting and fining in a float glass facility.

A cerium containing compound is added to the batch composition to impart ultraviolet radiation absorbency to the ultimately produced glass product. The cerium containing compound is added in an amount great enough to effectively absorb ultraviolet radiation, but less than an amount which would otherwise substantially affect the color of the glass by causing a yellowish tinge. Suitable cerium containing compounds include, but are not limited to, cerous carbonate (also known as cerium (III) carbonate hydrate), ceric oxide, cerous oxalate, ceric hydroxide, and the like. A preferred cerium containing compound is cerous carbonate, which is generally added to the batch composition in an amount of from 0.30 to about 2.15 weight percent of the total glass batch mixture, so as to result in a ceric oxide concentration in the resultant glass product of from about 0.2% to about 1.4% by weight of the glass.

Alternatively, a mixture of a cerium containing compound and titanium dioxide may be added in place of the aforementioned amount of a cerium containing compound alone. For example, cerous carbonate may be generally added to the batch composition in an amount of from 0.54 to about 1 percent by weight of the batch, along with titanium dioxide in an amount equal to about 0.15 to about 0.35 weight percent of the batch, so as to result in a concentration from about 0.35 to about 0.65 weight percent $CeO_2$ and from about 0.15 to about 0.35 weight percent $TiO_2$ in the glass. The mixture of the ceric oxide and titanium dioxide in the glass has the same operability and utility as the greater required amount of ceric oxide alone.

Iron is added to the batch composition, typically as $Fe_2O_3$, iron oxalate, metallic iron, or the like. When the batch composition is melted in the float glass tank, the redox reaction between the iron, cerium containing compound, and carbon results in the reduction of a portion of the $Fe_2O_3$ to FeO, until an equilibrium ferrous value is established. Thus, the iron is added to the batch composition so as to produce a high total iron concentration from about 0.70% to about 1.25% by weight of the glass. Preferably, the concentration is from about 0.75% to about 0.9% by weight of the glass. The ferrous value, which imparts the green color to the high total iron containing glass produced from the batch compositions of the present invention, is generally from about 22% to about 29%. Preferably, the ferrous value is from about 24% to about 27%.

It is generally known that the amount of carbon which must be added to a low total iron containing soda-lime-silica float glass melt, i.e., a batch composition for producing a glass containing about 0.5% by weight total iron and about 1% by weight ceric oxide, is in the range of about 0.9 pounds of carbon per 1,000 pounds of glass, in order to produce a green-colored glass. However, the amount of carbon which must be added to a high total iron containing soda-lime-silica float glass melt, which additionally contains a cerium containing compound so as to produce a glass containing, for example, about 1% by weight ceric oxide, according to the present invention, is surprisingly less than the amount required for the aforementioned low total iron containing glass. The range of carbon required for the batch compositions of the present invention is from about 0.15 to about 0.75 pounds per 1,000 pounds of glass, to produce a green-colored glass having a ferrous value from about 22% to about 29%. The term "carbon" as used herein means any carbonaceous material generally known for providing carbon to glass batches, such as for example sea coal, wood flour, etc. The amount of carbon required when using a cerium containing compound alone, as hereindescribed without $TiO_2$, is from about 0.3 to about 0.75 pounds per 1,000 pounds of glass, and the amount of carbon required when using a cerium containing compound in combination with titanium dioxide is from about 0.15 to about 0.5 pounds per 1,000 pounds of glass.

The batch compositions of the present invention, when used to produce glass sheets having a total glass thickness of about 3.2 mm to 5 mm, can exhibit an Illuminant A visible light transmittance value of at least 70%, and provide combined infrared energy and ultraviolet radiation transmittance values substantially lower than the compositions disclosed in the prior art.

The total solar energy transmittance of the compositions of the present invention, at selected glass thicknesses in the range of 3 mm to 5 mm, is less than about 46%. Preferably, the total solar energy transmittance in these thicknesses is less than about 45%. Total solar energy transmittance is a measure of the solar energy transmittance over all solar energy wavelengths. It is an integrated term covering the area under the transmittance versus wavelength curve for visible, infrared and ultraviolet energy wavelengths.

The ultraviolet radiation transmittance of the compositions of the present invention is less than about 36%, at selected glass thicknesses in the range of 3 mm to 5 mm, and generally not more than about 34%. The ultraviolet radiation transmittance value is an integrated term representing the area under the transmittance versus wavelength curve for wavelengths between 300 and 400 nanometers. The ultraviolet radiation transmittance values for glass compositions of the present invention were calculated by integrating the Perry Moon air mass 2 solar spectral energy distribution* between 300 and 400 nm, and ratioing the attenuated energy transmitted by the sample over that same spectral region. The green color is characterized by an Illuminant C dominant wavelength from about 498 nm to about 525 nm, preferably from about 498 nm to about 519 nm, and a color purity from about 2% to about 4%, preferably from about 2% to about 3%.

A glass batch composition in accordance with the invention, for producing an infrared energy and ultraviolet radiation absorbing green-colored glazing having a total glass thickness of approximately 3.2 mm, the glass having a ferrous value from about 22% to about 29%, comprises:

A) a soda-lime-silica float glass batch mixture including the following ingredients in their indicated relative proportions;
  1) 1,000±200 pounds of sand;
  2) 330±50 pounds of soda ash;
  3) 250±50 pounds of dolomite;
  4) 70±50 pounds of limestone; and
  5) 12±8 pounds of a sulfate selected from the group consisting of salt cake and gypsum;
B) cerous carbonate in an amount from about 0.84 to about 1.0 weight percent of the total batch weight of (A);
C) titanium dioxide in an amount from about 0.25 to about 0.35 weight percent of the total batch weight of (A);
D) an amount of iron containing compound in the range of from about 0.9 to 1.25 weight percent of the total weight of (A); and
E) a quantity of carbon, which is less than the amount of carbon required to achieve the same ferrous value in a glass produced from a glass batch comprising ingredients A, B, C, and an amount of iron containing compound so as to result in 0.5 weight percent total iron in the glass.

With reference to this batch composition, the amount of carbon can be from about 0.35 to about 0.50 pounds per 1,000 pounds of glass produced.

A glass batch composition in accordance with the invention, for producing an infrared energy and ultraviolet radiation absorbing green-colored glazing having a total glass thickness of approximately 4 mm, the glass having a ferrous value from about 22% to about 29%, comprises:

A) a soda-lime-silica float glass batch mixture including the following ingredients in their indicated relative proportions;
  1) 1,000±200 pounds of sand;
  2) 330±50 pounds of soda ash;
  3) 250±50 pounds of dolomite;
  4) 70±50 pounds of limestone; and
  5) 12±8 pounds of a sulfate selected from the group consisting of salt cake and gypsum;
B) cerous carbonate in an amount from about 0.84 to about 1.0 weight percent of the total batch weight of (A);
C) titanium dioxide in an amount from about 0.25 to about 0.35 weight percent of the total batch weight of (A);
D) an amount of iron containing compound in the range of from about 0.9 to 1.25 weight percent of the total weight of (A); and
E) a quantity of carbon, which is less than the amount of carbon required to achieve the same ferrous value in a glass produced from a glass batch comprising ingredients A, B, C, and an amount of iron containing compound so as to result in 0.5 weight percent total iron in the glass.

With reference to this batch composition, the amount of carbon can be from about 0.35 to about 0.50 pounds per 1,000 pounds of glass produced.

A glass batch composition in accordance with the invention, for producing an infrared energy and ultraviolet radiation absorbing green-colored glazing having a total glass thickness of approximately 5 mm, the glass having a ferrous value from about 22% to about 29%, comprises:

A) a soda-lime-silica float glass batch mixture including the following ingredients in their indicated relative proportions;
  1) 1,000±200 pounds of sand;
  2) 330±50 pounds of soda ash;
  3) 250±50 pounds of dolomite;
  4) 70±50 pounds of limestone; and
  5) 12±8 pounds of a sulfate selected from the group consisting of salt cake and gypsum;
B) cerous carbonate in an amount from about 0.84 to about 1.0 weight percent of the total batch weight of (A);
C) titanium dioxide in an amount from about 0.25 to about 0.35 weight percent of the total batch weight of (A);
D) an amount of iron containing compound in the range of from about 0.9 to 1.25 weight percent of the total weight of (A); and
E) a quantity of carbon, which is less than the amount of carbon required to achieve the same ferrous value in a glass produced from a glass batch comprising ingredients A, B, C, and an amount of iron containing compound so as to result in 0.5 weight percent total iron in the glass.

With reference to this batch composition, the amount of carbon can be from about 0.35 to about 0.40 pounds per 1,000 pounds of glass produced.

EXAMPLES 1-11

Various amounts of rouge, cerous carbonate, and carbon are added to a soda-lime-silica float glass batch mixture, which typically comprises the following ingredients in their indicated proportions:

Sand: 1,000 pounds
Soda Ash: 326 pounds
Dolomite: 248 pounds
Limestone: 67 pounds
Salt Cake: 8 pounds The amounts of rouge, cerous carbonate, and carbon added are as follows:

TABLE I

| | Glass Batch Ingredients | | | | |
|---|---|---|---|---|---|
| | Cerous Carbonate (pounds) | TiO$_2$ (pounds) | Rouge (pounds) | Carbon (pounds) | Pounds Carbon per 1,000 Pounds Glass |
| Example 1 | 24 | -0- | 11.5 | 0.42 | 0.30 |
| Example 2 | 24 | -0- | 11.5 | 0.49 | 0.35 |
| Example 3 | 24 | -0- | 11.5 | 0.56 | 0.40 |
| Example 4 | 24 | -0- | 11.5 | 0.63 | 0.45 |
| Example 5 | 24 | -0- | 11.5 | 0.63 | 0.45 |
| Example 6 | 24 | -0- | 11.5 | 0.70 | 0.50 |
| Example 7 | 16 | 4.2 | 14.5 | 0.63 | 0.45 |
| Example 8 | 16 | 4.2 | 14.5 | 0.63 | 0.45 |
| Example 9 | 24 | -0- | 14.5 | 0.98 | 0.70 |
| Example 10 | 13.0 | 3.5 | 11.5 | 0.52 | 0.37 |
| Example 11 | 11.5 | 3.2 | 10.5 | 0.45 | 0.32 |

Silica scum does not form during the melting of the aforementioned batch ingredients, and silica inclusion faults are not observed in the resultant glass.

The properties of the resultant glasses at a thickness of 4 mm are as follows:

TABLE II

|  | Ex.1 | Ex.2 | Ex.3 | Ex.4 | Ex.5 | Ex.6 |
|---|---|---|---|---|---|---|
| Glass Thickness | 4 mm | 4 mm | 4 mm | 4 mm | 4 mm | 4 mm |
| Total Iron, as $Fe_2O_3$ (%) | .782 | .789 | .783 | .788 | .788 | .784 |
| $CeO_2$ (%) | .913 | .909 | .915 | .914 | .913 | .911 |
| Ferrous Value (%) | 25.1 | 25.7 | 26.2 | 27.3 | 27.5 | 27.7 |
| Illuminant A (%) | 72.8 | 72.3 | 72.2 | 71.2 | 71.5 | 71.6 |
| Total Solar Transmittance (%) | 45.9 | 45.1 | 44.8 | 43.9 | 43.7 | 43.6 |
| UV Transmittance (%) | 33.0 | 33.2 | 33.3 | 33.5 | 33.5 | 43.6 |
| Illuminant C Dominant Wavelength (nm) | 512.8 | 509.2 | 508.2 | 505.2 | 504.5 | 504.6 |
| Color Purity (%) | 2.4 | 2.4 | 2.5 | 2.8 | 2.9 | 2.9 |

|  | Ex. 7 | Ex. 8 | Ex.9 | Ex.10 | Ex. 11 |
|---|---|---|---|---|---|
| Glass Thickness | 3.4 mm | 3.2 mm | 3.2 mm | 4 mm | 5 mm |
| Total Iron, as $Fe_2O_3$ (%) | .981 | .994 | .994 | .835 | .743 |
| $CeO_2$ (%) | .596 | .584 | .93 | .517 | .473 |
| $TiO_2$ (%) | .294 | .284 | -0- | .262 | .241 |
| Ferrous Value (%) | 25.4 | 25.4 | 25.4 | 25.7 | 25 |
| Illuminant A (%) | 70.5 | 71.4 | 71.4 | 71.6 | 71.6 |
| Total Solar Transmittance (%) | 43.3 | 44.6 | 44.7 | 43.7 | 43.5 |
| UV Transmittance (%) | 29.3 | 30.9 | 33.2 | 32.0 | 31.8 |
| Illuminant C Dominant Wavelength (nm) | 537.5 | 534.8 | 510.0 | 519.9 | 518.4 |
| Color Purity (%) | 3.5 | 3.1 | 2.8 | 2.5 | 2.6 |

What is claimed is:

1. A glass batch composition for producing an infrared energy and ultraviolet radiation absorbing green-colored glass, the glass having a ferrous value between about 22% and about 29%, said batch composition comprising:
   A) a soda-lime-silica float glass batch mixture;
   B) an ultraviolet radiation absorbing quantity of a cerium containing compound in an amount which results in a glass containing from about 0.2 to about 1.4 weight percent $CeO_2$;
   C) an amount of an iron containing compound so as to result in at least 0.70 weight percent total iron in the glass; and
   D) a quantity of carbon, which is less than the amount of carbon required to achieve the same ferrous value in a glass produced from a glass batch comprising ingredients A, B, and an amount of iron containing compound so as to result in 0.5 weight percent total iron in the glass.

2. The glass batch ;composition according to claim 1, wherein said soda-lime-silica float glass batch mixture comprises the following ingredients in their indicated relative proportions:
   A) 1,000±200 pounds of sand;
   B) 330±50 pounds of soda ash;
   C) 250±50 pounds of dolomite;
   D) 70±50 pounds of limestone; and
   E) 12±8 pounds of a sulfate selected from the group consisting of salt cake and gypsum.

3. The glass batch composition according to claim 1, wherein said cerium containing compound is selected from the group consisting of cerous carbonate, ceric oxide, cerous oxalate and ceric hydroxide.

4. The glass batch composition according to claim 1, wherein said quantity of cerium containing compound is cerous carbonate in an amount of from about 0.30 to about 2.15 weight percent of the glass batch mixture.

5. The glass batch composition according to claim 1, wherein said iron containing compound is added in an amount so as to result in a concentration of total iron in the glass of from about 0.70% to about 1.25% by weight.

6. The glass batch composition according to claim 1, wherein the ferrous value in the glass is from about 24% to about 27%.

7. The glass batch composition according to claim 1, wherein said quantity of carbon is from about 0.3 pounds to about 0.75 pounds per 1,000 pounds of glass produced.

8. A glass batch composition for producing an infrared energy and ultraviolet radiation absorbing green-colored glass, the glass having a ferrous value from about 22% to about 29%, said batch composition comprising:
   A) a soda-lime-silica float glass batch mixture;
   B) an ultraviolet radiation absorbing quantity of a cerium containing compound and a titanium containing compound, in an amount which results in a glass containing from about 0.35 to about 0.65 weight percent $CeO_2$ and from about 0.15 to about 0.35 weight percent $TiO_2$;
   C) an amount of an iron containing compound so as to result in at least 0.70 weight percent total iron in the glass; and
   D) a quantity of carbon, which is less than the amount of carbon required to achieve the same ferrous value in a glass produced from a glass batch comprising ingredients A, B, and an amount of iron containing compound so as to result in 0.5 weight percent total iron in the glass.

9. The glass batch composition according to claim 8, wherein the soda-lime-silica float glass batch mixture comprises the following ingredients in their indicated relative proportions:
   A) 1,000±200 pounds of sand;
   B) 330±50 pounds of soda ash;
   C) 250±50 pounds of dolomite;
   D) 70±50 pounds of limestone; and
   E) 12±8 pounds of a sulfate selected from the group consisting of salt cake and gypsum.

10. The glass batch composition according to claim 8, wherein said cerium containing compound is selected from the group consisting of cerous carbonate, ceric oxide, cerous oxalate and ceric hydroxide.

11. The glass batch composition according to claim 8, wherein said quantity of cerium containing compound is cerous carbonate in the range of from 0.54 to 1 weight percent of the glass batch mixture.

12. The glass batch composition according to claim 8, wherein said iron is added so as to result in a concentration of total iron in the glass from 0.70% to about 1.25% by weight.

13. The glass batch composition according to claim 8 wherein the ferrous value in the glass is from about 24% to about 27%.

14. The glass batch composition according to claim 8 wherein said carbon is from about 0.15 pounds to about 0.5 pounds per 1,000 pounds of glass produced.

15. A glass batch composition for producing an infrared energy and ultraviolet radiation absorbing green-colored glass, the glass having a ferrous value between about 22% to about 29%, comprising:
   A) a soda-lime-silica float glass batch mixture including the following ingredients in their indicated relative proportions;
      1) 1,000±200 pounds of sand;
      2) 330±50 pounds of soda ash;
      3) 250±50 pounds of dolomite;
      4) 70±50 pounds of limestone; and
      5) 12±8 pounds of a sulfate selected from the group consisting of salt cake and gypsum;
   B) cerous carbonate in an amount from about 0.54 to about 1.0 weight percent of the total batch weight of (A);
   C) titanium dioxide in an amount from about 0.15 to about 0.35 weight percent of the total batch weight of (A);
   D) an amount of iron containing compound in the range of from about 0.70 to 1.25 weight percent of the total weight of (A); and
   E) a quantity of carbon, which is less than the amount of carbon required to achieve the same ferrous value in a glass produced from a glass batch comprising ingredients A, B, C, and an amount of iron containing compound so as to result in 0.5 weight percent total iron in the glass.

16. A process for melting a batch composition and producing an ultraviolet radiation absorbing green colored soda-lime-silica glass, the glass having a ferrous value of between 22% to about 29%, comprising admixing, heating and melting:
   A) a soda-lime-silica float glass batch mixture;
   B) a quantity of a cerium containing compound in an amount which results in a glass containing from about 0.2 to about 1.4 weight percent CeO$_2$;
   C) an amount of an iron containing compound so as to result in at least 0.70 weight percent total iron in the glass; and
   D) a quantity of carbon, which is less than the amount of carbon required to achieve the same ferrous value in a glass produced from a glass batch comprising ingredients A, B, and an amount of iron containing compound so as to result in 0.5 weight percent total iron in the glass;
thereby avoiding the formation of silica scum on the surface of the melt in an amount sufficient to have a deleterious effect on the quality of glass formed by the float process.

17. The process according to claim 16, wherein said soda-lime-silica float glass batch mixture comprises the following ingredients in their indicated relative proportions:
   A) 1,000±200 pounds of sand;
   B) 330±50 pounds of soda ash;
   C) 250±50 pounds of dolomite;
   D) 70±50 pounds of limestone; and
   E) 12±8 pounds of a sulfate selected from the group consisting of salt cake and gypsum.

18. The process according to claim 16, wherein said cerium containing compound is selected from the group consisting of cerous carbonate, ceric oxide, cerous oxalate and ceric hydroxide.

19. A process for melting a batch composition and producing an ultraviolet radiation absorbing green colored soda-lime-silica glass, the glass having a ferrous value of between 22% to about 29%, comprising admixing and heating and melting:
   A) a soda-lime-silica float glass batch mixture;
   B) a quantity of a cerium containing compound in an amount which results in a glass containing from about 0.35 to about 0.65 weight percent CeO$_2$;
   C) a quantity of a titanium containing compound in an amount which results in a glass containing from about 0.15 to about 0.35 weight percent TiO$_2$;
   D) an amount of an iron containing compound so as to result in at least 0.70 weight percent total iron in the glass; and
   E) a quantity of carbon, which is less than the amount of carbon required to achieve the same ferrous value in a glass produced from a glass batch comprising ingredients A, B, C, and an amount of iron containing compound so as to result in 0.5 weight percent total iron in the glass;
thereby avoiding the formation of silica scum on the surface of the melt in an amount sufficient to have a deleterious effect on the quality of glass formed by the float process.

20. The process according to claim 19, wherein said soda-lime-silica float glass batch mixture comprises the following ingredients in their indicated relative proportions:
   A) 1,000±200 pounds of sand;
   B) 330±50 pounds of soda ash;
   C) 250±50 pounds of dolomite;
   D) 70±50 pounds of limestone; and
   E) 12±8 pounds of a sulfate selected from the group consisting of salt cake and gypsum.

21. The process according to claim 19, wherein said cerium containing compound is selected from the group consisting of cerous carbonate, ceric oxide, cerous oxalate and ceric hydroxide.

22. A glass batch composition in accordance with the invention, for producing an infrared energy and ultraviolet radiation absorbing green-colored glazing having a total glass thickness of approximately 3.2 mm, the glass having a ferrous value from about 22% to about 29%, comprises:
   A) a soda-lime-silica float glass batch mixture including the following ingredients in their indicated relative proportions;
      1) 1,000±200 pounds of sand;
      2) 330±50 pounds of soda ash;
      3) 250±50 pounds of dolomite;
      4) 70±50 pounds of limestone; and
      5) 12±8 pounds of a sulfate selected from the group consisting of salt cake and gypsum;
   B) cerous carbonate in an amount from about 0.84 to about 1.0 weight percent of the total batch weight of (A);
   C) titanium dioxide in an amount from about 0.25 to about 0.35 weight percent of the total batch weight of (A);
   D) an amount of iron containing compound in the range of from about 0.9 to 1.25 weight percent of the total weight of (A); and
   E) a quantity of carbon, which is less than the amount of carbon required to achieve the same ferrous value in a glass produced from a glass batch comprising ingredients A, B, C, and an amount of iron containing compound so as to result in 0.5 weight percent total iron in the glass.

23. A glass batch composition in accordance with the invention, for producing an infrared energy and ultraviolet radiation absorbing green-colored glazing having a total glass thickness of approximately 4 mm, the glass having a ferrous value from about 22% to about 29%, comprises:
  A) a soda-lime-silica float glass batch mixture including the following ingredients in their indicated relative proportions;
    1) 1,000±200 pounds of sand;
    2) 330±50 pounds of soda ash;
    3) 250±50 pounds of dolomite;
    4) 70±50 pounds of limestone; and
    5) 12±8 pounds of a sulfate selected from the group consisting of salt cake and gypsum;
  B) cerous carbonate in an amount from about 0.69 to about 0.84 weight percent of the total batch weight of (A);
  C) titanium dioxide in an amount from about 0.2 to about 0.3 weight percent of the total batch weight of (A);
  D) an amount of iron containing compound in the range of from about 0.75 to 0.9 weight percent of the total weight of (A); and
  E) a quantity of carbon, which is less than the amount of carbon required to achieve the same ferrous value in a glass produced from a glass batch comprising ingredients A, B, C, and an amount of iron containing compound so as to result in 0.5 weight percent total iron in the glass.

24. A glass batch composition in accordance with the invention, for producing an infrared energy and ultraviolet radiation absorbing green-colored glazing having a total glass thickness of approximately 5 mm, the glass having a ferrous value from about 22% to about 29%, comprises:
  A) a soda-lime-silica float glass batch mixture including the following ingredients in their indicated relative proportions;
    1) 1,000±200 pounds of sand;
    2) 330±50 pounds of soda ash;
    3) 250±50 pounds of dolomite;
    4) 70±50 pounds of limestone; and
    5) 12±8 pounds of a sulfate selected from the group consisting of salt cake and gypsum;
  B) cerous carbonate in an amount from about 0.61 to about 0.76 weight percent of the total batch weight of (A);
  C) titanium dioxide in an amount from about 0.18 to about 0.28 weight percent of the total batch weight of (A);
  D) an amount of iron containing compound in the range of from about 0.70 to 0.85 weight percent of the total weight of (A); and
  E) a quantity of carbon, which is less than the amount of carbon required to achieve the same ferrous value in a glass produced from a glass batch comprising ingredients A, B, C, and an amount of iron containing compound so as to result in 0.5 weight percent total iron in the glass.

25. The glass batch composition according to claim 22, wherein said carbon is from about 0.35 to about 0.50 pounds per 1,000 pounds of glass produced.

26. The glass batch composition according to claim 23, wherein said carbon is from about 0.30 to about 0.45 pounds per 1,000 pounds of glass produced.

27. The glass batch composition according to claim 24, wherein said carbon is from about 0.25 to about 0.40 pounds per 1,000 pounds of glass produced.

* * * * *

UNITED STATES PATENT AND TRADEMARK OFFICE
CERTIFICATE OF CORRECTION

PATENT NO. : 5,112,778
DATED : May 12, 1992
INVENTOR(S) : J. Joseph Cheng et al.

It is certified that error appears in the above-identified patent and that said Letters Patent is hereby corrected as shown below:

Column 1, line 20, "(FezO)" should read --$(Fe_2O_3)$.--

Column 6, line 53, insert --*-- before the footnote "Radiation transmittance results ...".

Column 8, line 60, insert --* From "Proposed Standard Solar-Radiation Curves for Engineering Use", Perry Moon, M.I.T., Journal of the Franklin Institute, No. 230, pp. 583-617 (1940).-- as the missing footnote to reflect back to "distribution*" at column 8, line 52.

Column 9, line 43, "0.84" should read --.69--; line 44, "1.0" should read --.84--; line 46, "0.25" should read --.2--; line 47, "0.35" should read --0.3--; line 50, "0.9 to 1.25" should read --0.75 to .9--; and line 59, "0.35 to about 0.50" should read --0.30 to about .45--.

Column 10, line 10, "0.84" should read --.61--; line 11, "1.0" should read --.76--; line 13, "0.25" should read --.18--; line 14, "0.35" should read --.28--; line 17, "0.9 to 1.25" should read --0.70 to .85--; and line 26, "0.35" should read --.25--.

Column 11, line 19, "43.6" should read --33.6--.

In the claims:
Claim 2, line 1, after "batch" delete the semicolon (;).

UNITED STATES PATENT AND TRADEMARK OFFICE
CERTIFICATE OF CORRECTION

PATENT NO. : 5,112,778
DATED : May 12, 1992
INVENTOR(S) : J. Joseph Cheng, et. al.

It is certified that error appears in the above-indentified patent and that said Letters Patent is hereby corrected as shown below:

Claim 14, line 1, insert a comma --,-- after "8".

Signed and Sealed this

Seventeenth Day of August, 1993

Attest:

BRUCE LEHMAN

Attesting Officer     Commissioner of Patents and Trademarks